(12) United States Patent
Kanevsky et al.

(10) Patent No.: US 7,685,313 B1
(45) Date of Patent: Mar. 23, 2010

(54) UNIVERSAL CONVERSION SERVER

(75) Inventors: Dimitri Kanevsky, Ossining, NY (US); Alexander Zlatsin, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 1270 days.

(21) Appl. No.: 09/584,810

(22) Filed: May 31, 2000

(51) Int. Cl.
    *G06F 15/16* (2006.01)
(52) U.S. Cl. .............. 709/246; 709/232; 709/247; 709/234; 709/219; 709/206
(58) Field of Classification Search ......... 709/246–247, 709/203, 232, 234, 206, 219
    See application file for complete search history.

(56) References Cited

U.S. PATENT DOCUMENTS

| | | | | |
|---|---|---|---|---|
| 5,608,874 | A * | 3/1997 | Ogawa et al. | 709/246 |
| 6,092,114 | A * | 7/2000 | Shaffer et al. | 709/232 |
| 6,119,137 | A * | 9/2000 | Smith et al. | 715/523 |
| 6,549,918 | B1 * | 4/2003 | Probert, Jr. et al. | 709/232 |
| 6,598,091 | B1 * | 7/2003 | Yoo et al. | 709/246 |
| 6,889,260 | B1 * | 5/2005 | Hughes | 709/246 |
| 2001/0056474 | A1 * | 12/2001 | Arai | 709/217 |

FOREIGN PATENT DOCUMENTS

CA  2192237  *  5/1997

OTHER PUBLICATIONS

TOM Server <http://wheel.compose.cs.cmu.edu:8001/cgi-bin/browse>.*
Olson, Michael A. DataBlade Extensions for INFORMIX-Universal Server. IEEE, 1997, pp. 143-148.*
CERN Document Service. <http://documents.cern.ch/Conver>.*
Advanced Computer Innovations, Inc. "Instant Online Conversion Service." <http://www.acii.com>.*

* cited by examiner

*Primary Examiner*—Alina N. Boutah
(74) *Attorney, Agent, or Firm*—Scully, Scott, Murphy & Presser, P.C.; Daniel P. Morris, Esq.

(57) ABSTRACT

A method and system for re-formatting computer files. The method comprises the steps of inputting a data file into a computer, and determining if the data file is compatible with the computer. If the data file is not compatible with the computer, the data file is transmitted over the Internet to a universal server; and the universal server transforms the data file into a format compatible with the computer, and sends the transformed data file back to the computer. Preferably, the universal server identifies the type of file, and transforms the file into a different format of the same type. Also, in a preferred embodiment, a user of the computer identifies user requirements, these requirements are transmitted to the universal server, and the file is reformatted in accordance with the user requirements.

2 Claims, 4 Drawing Sheets

UNIVERSAL CONVERSION SERVER

BACKGROUND OF THE INVENTION

The present invention relates to computer systems. More specifically, the invention relates to methods and systems for allowing a computer to work with input data that is in a format nominally incompatible with the computer.

Many forms of computer operating systems, hardware applications exist today, such as Macintosh, IBM, Intel, Dell, etc. A common problem among computer users today, is the difficulties and inconveniences caused by using, or trying to use, data from one operating system on a different operating system. For example, if a person receives through e-mail an application that was in a Macintosh format, that person may not be able to run the application if they have a Dell computer.

A commonly used solution for this problem is a filter that is located in the application and that allows certain files to be formatted to another type of application. This solution is inconvenient, however, because it is very difficult to find all the types of filters that would be needed so that every type of file could be used. For example, Microsoft Word file formatted to WordPro file or format file from one version of application to another. Simulation of one operating system in another operating system. For example, DOS is simulated in the Unix operating system.

Another solution is to use a "Universal Driver Server" patent application Ser. No. 09/564,619 filed May 4, 2000, that can transform almost any file through a server. For example, if a person receives a game that is compatible only for Macintosh, and the person owns an Intel computer, then that person may go on the Internet to look for the same game in a format that is compatible to their own operating system. This solution works in some cases, but very often, similar software is not found.

SUMMARY OF THE INVENTION

An object of this invention is to provide a procedure that allows a person to use data, from one computer operating system, in a computer having a different operating system.

Another object of the present invention is to provide a universal server online that is able to transform fully any type of file.

Another object of the present invention is to convert file from one application format or version to another.

These and other objectives are attained with a method and system for re-formatting computer files. The method comprises the steps of inputting a data file into a computer, and determining if the data file is compatible with the computer. If the data file or application program is not compatible with the computer or application, the data file or program is transmitted over the Internet to a universal server; and the universal server transforms the data file or program into a format compatible with the computer, and sends the transformed data file back to the computer.

Preferably, the universal server identifies the type of file or application program, and transforms the file into a different format of the same type. Also, in a preferred embodiment, a user of the computer identifies user requirements, these requirements are transmitted to the universal server, and the file is reformatted in accordance with the user requirements.

With the present invention, for example, a person, who owns a Dell computer, may receive a program from a Macintosh user. The person can then go on the Internet, and the sever automatically takes the program and transforms it into a compatible form. The program is then sent back to the person in a usable form. This process can be done with any type of file.

We are offering a business model program developers will have agreement with universal conversion server to keep links to their source code. When customer/user pays for license, for example the limited access to the source code will be given to compile it on appropriate operating system.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
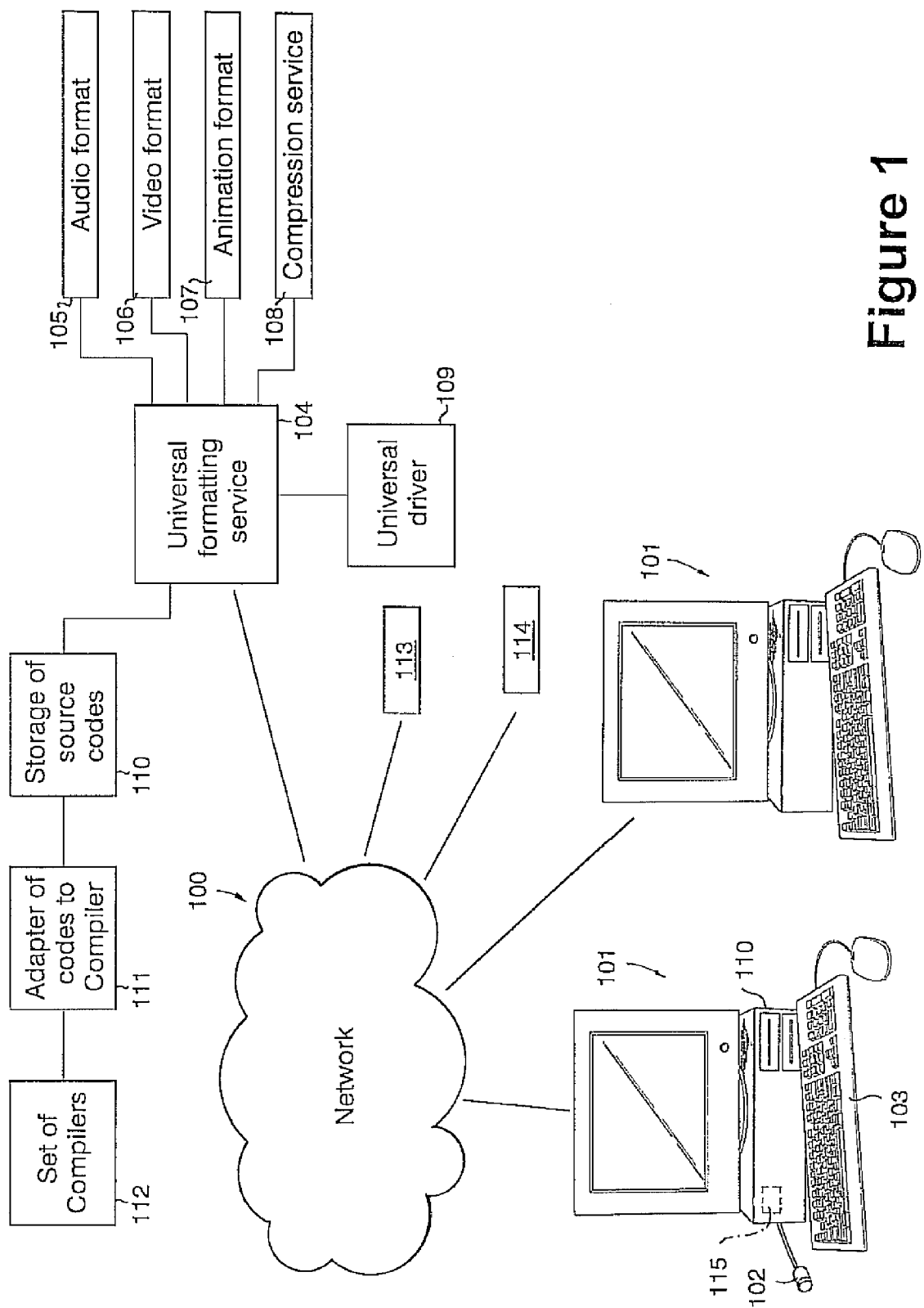
FIG. 1 is a general block diagram illustrating a universal conversion server embodying this invention.

FIG. 1 shows the general block scheme of a universal conversion server. In this service, a network 100 is connected to a computer 101, which may be a personal computer. The computer is connected to a microphone 102 and to a keyboard 103. The computer also has the appropriate driver 110. Voice commands or input are given through the microphone, typed commands are given through the keyboard, and the driver is used to transmit data to disks and compact disks.

If, for example, a person may receive data from the Internet in the form of voice data 113, the person may want to compress the data into another format because the person may not have a compatible driver. In this case, the person sends the data to a Universal conversion server 104 and states what operation needs to be performed and what operating system they may own. This universal conversion server (UCS) determines what should be done from the user description or from type of file and information about user computer.

The UCS sends the data to an appropriate formatting module. Different methods are available to determine type of file. For example, if the data are audio data, the data are sent to be audio formatted 105. If the data are video data 114, the data are sent to be video formatted 106; and if the data are animation the data are sent to a server that can format animation data 107. The data can also be sent to a generic compression service 108. It is also indicated to which operating system the data should be formatted, and whether the data should be upgraded or downgraded.

The universal conversion server 104 can define automatically what should be changed or\and how it should be changed. The universal conversion server 104 has access to the user computer 101 via the network 100. It can read from a special system file 115 in the user computer the information about the computer (what is the operational system, what applications are stored in this computer, e.g. word pro or Microsoft word etc.). The universal conversion server (UCS) can use this information to decide how to change the file that it received from the user. For example, if the UCS received the audio data from the computer 101 and did not receive any explanations what should be done, it can do the following. First, it defines what type of data it received (audio, video etc.). It can define the type of data using different methods. Some of these methods are described in a patent application Ser. No. 09/137,966. After the UCS defines the type of data and in which operational system (OS) it was formatted, it checks what OS is used in the computer 101 and what applications are available in 101 to process this type of data. If the UCS finds that there is some application in the computer that can process this type of data but that the data was initially formatted to be processed by a different application, then the UCS sends the data to an appropriate formatting server with the request to reformat it to the application that is available in the computer 101. For example, if the UCS received a textual data that was formatted for Microsoft word and if the UCS found that the user computer 101 has only Word Pro application, than the UCS sends the textual data to a text formatting server 120 and requests to reformat it from Microsoft Word format to Word Pro format. Similarly the UCS reformat data to the OS system that is used by the user computer 101.

The Universal conversion server is also connected to the Universal Driver 109. The Universal Driver patent application performs some of the conversion operations.

The Universal Driver 109 can be used to read data from a local computer drivers. The Universal Driver is described in the Ser. No. 09/564,619. For example, instead of sending data from the computer 101 to the UCS 104 the user requests the UCS to read the data from his driver A: that contains a floppy disk that was formatted in a different operational system. In this case the user computer 101 cannot process the data that is located in the floppy disk. In this case the UCS forwards the request to the Universal Driver 109 that can handle remotely drivers. The Universal Driver can read files from the driver in the computer 101 and reformat some of files that are located in the driver (e.g. floppy disk) to the format of the OS in the computer 101. In the patent application (Universal Driver Server, the Ser. No. 09/564,619) two kinds of files can be converted to a new format. One kind of files are some data (like texts, audio, video etc.). This data should be reformatted to a different OS in order that it is readable/playable/visualised etc. in the user computer 101. The other type of data are programs (e.g. video games). In the patent application Universal Driver Server the Universal Driver can process some programs if it finds the equivalent programs that were adjusted for OS in the computer 101. For example, if the Universal Driver finds the game that was developed for Apple computer and the user computer 101 is Intel, then the Universal Driver looks in the storage for similar games that can be run in Intel. If it finds such a game then it sends this game to the user computer 101. But if it does not find such games in the storage for Intel computer one can use new methods that are explained in FIG. 3 in more details.

Briefly, this method can be explained as follows: The UCS searches in the module 110 (storage of source codes) whether there are source codes that were used to compile the program (e.g. game) that was received from the user computer 101 or that is stored on the disk in the user computer (e.g. game) that was received from the user computer 101 or that is stored on the disk in the user computer (e.g. floppy disk) (that is accessible from the Universal Driver 109). Usually programs that people use in computers are compiled from some source code. The same source code can be used to compile a source code to different OS. If the UCS finds the source code in 110 from which the program was compiled, the UCS used a module 111 to adapt the source code for compilation in OS that is in the computer 101. Usually, only small modifications are needed to adapt a source code for compilation to a different operation system. For example, if the source code was done for compilation in UNIX and it is necessary to compile a source code in NT, then should change formats for integers. After the source code is adapted in 111 for a different compiler it is compiled using a suitable compiler from the set of compilers in 112. Then a new compiled program (e.g. game) is sent to the user computer 101.

Figure 2:
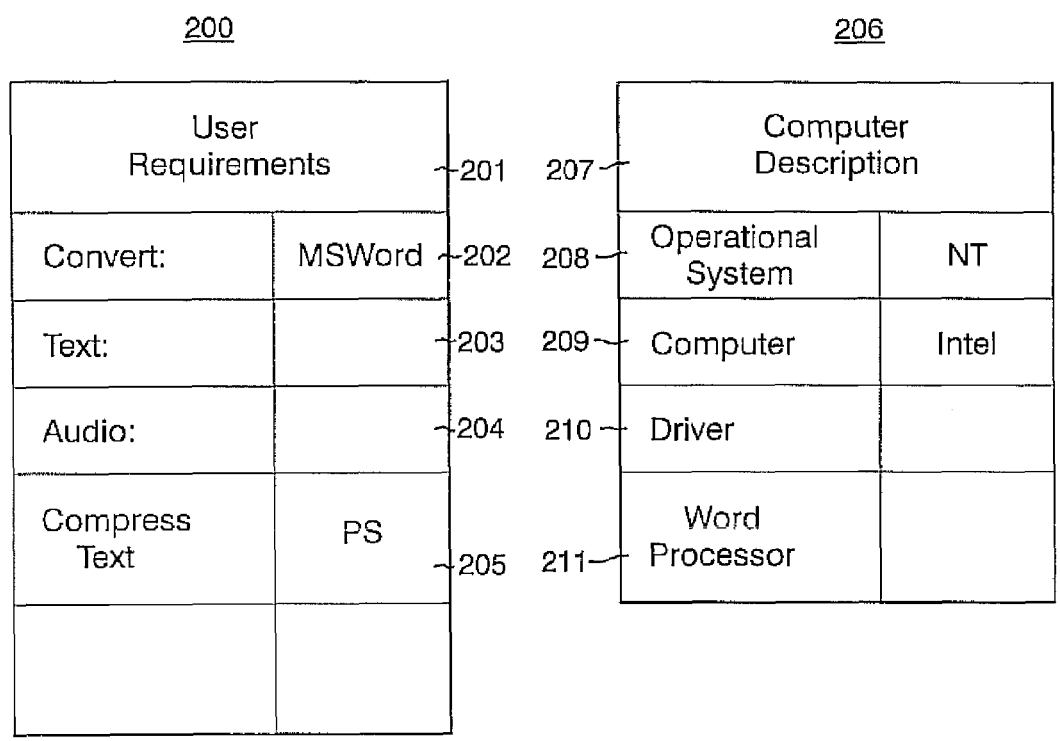
FIG. 2 is an example of a database that is used by the universal server of FIG. 1.

FIG. 2 describes what needs to be done with the data that are given to the Universal Server. Table 200 shows the user requirements. At 201, the user manually enters all the data. For example, at 202, the user states what needs to be converted. Row 203 shows any text that must be converted into Microsoft Word, row 204 shows all the audio files that need to be converted into WAVE files, and row 205 shows the compressed text that needs to be converted into post script format. When data needs to be converted, the data are sent to the Universal Formatting Server.

The Universal Conversion Server checks the User Requirements 200. If this Conversion Server finds that it cannot convert a certain file, it looks in a computer description 206. This computer description can be located on the computer 101 or on the Universal Conversion Server Database. The actual computer description 207 includes four components: row 208 shows the operating system, in this case it is NT; row 209 shows the type of computer, here it is Intel; row 210 shows what driver is being used; and row 211 shows the word processor that is being used. The computer description system is read from a special system file that is located on a computer 115.

Figure 3:
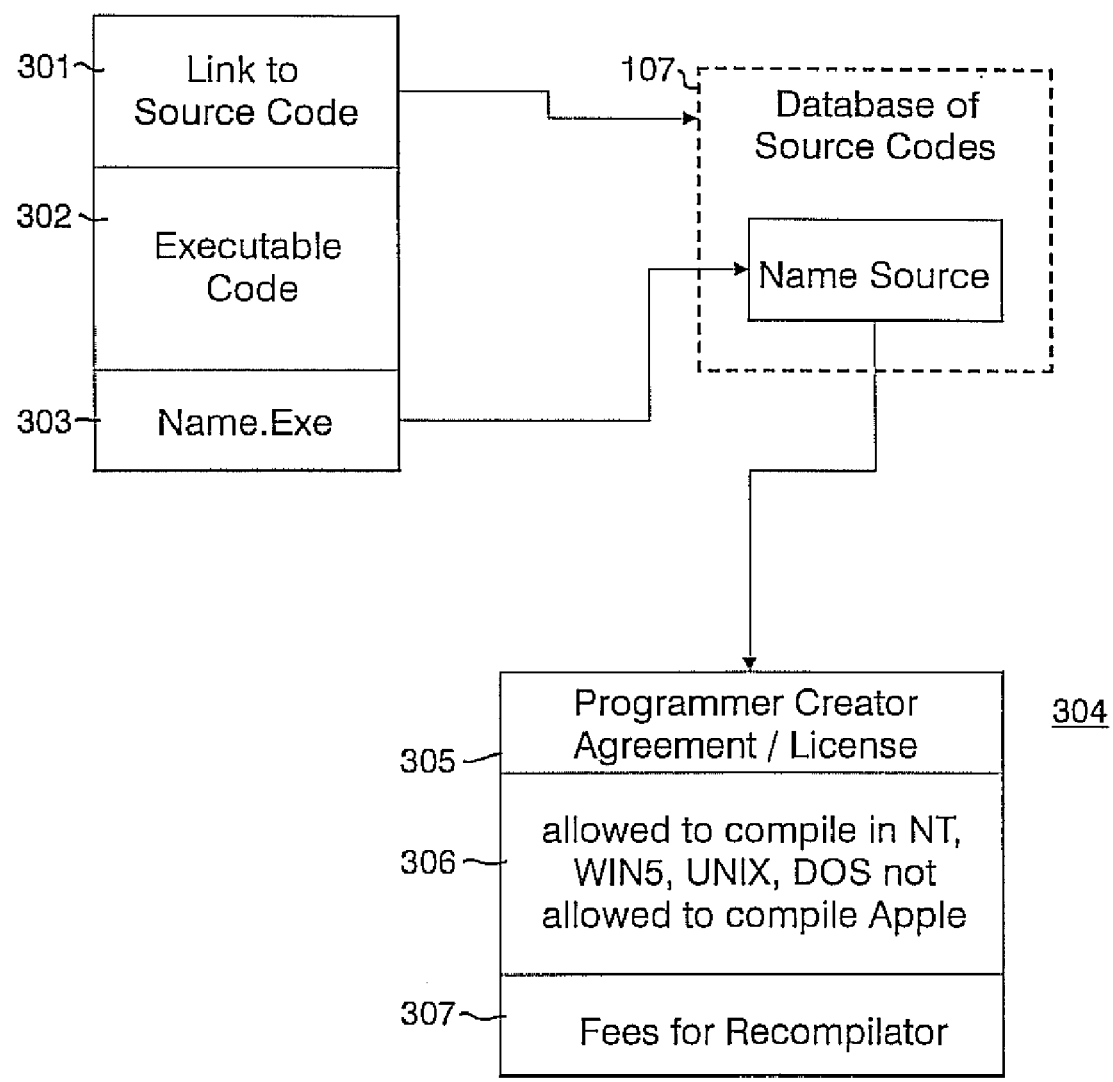
FIG. 3 generally illustrates a procedure for reformatting a program.

FIG. 3 explains what needs to be done when a computer's operating system is not compatible with a program. First, the name of the program is read by the Universal Driver. It was explained above that the Universal Driver can read the name of the program and check whether such program is available for a different operating systems. If not, Universal Driver sends the program to the UCS which searches for the source code in order to compile the program. Table 300 shows the features associated with the program. 301 is the link to the program's source code, 302 is the program's executable code, and 303 is the programs's file name. These data are searched in the database of source codes 110, where many source codes are held. If the same name exists among more than one program in the database, the UCS reads the information from the description module 304. 305 is the license agreement, 306 shows what compilations are allowed, and 307 shows the fees for the recompilations.

Figure 4:
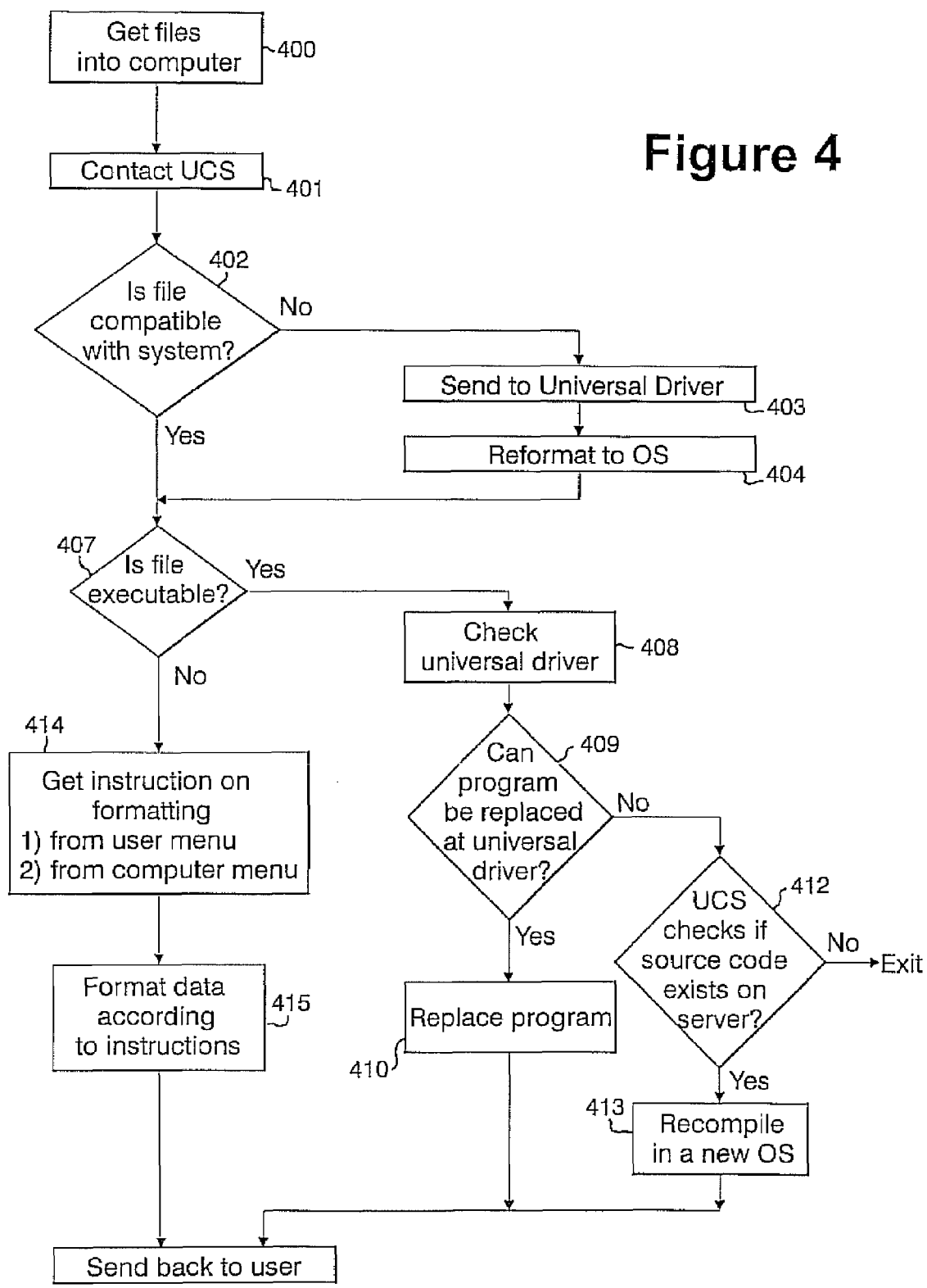
FIG. 4 is a flow chart of a preferred universal conversion system.

FIG. 4 is a flow chart of the universal conversion system. At step 400, files are entered into the computer (either from the user or from network), and at step 401 the UCS is contacted. At step 402, a check is made to determine whether the file format is compatible with the operating system (OS) in the computer. If the format is not compatible, it means that the file is not recognized by a OS (i.e. on any input media such as CD-ROM, a floppy disk, tape, e-mail, etc.). In this case, the file is sent to the Universal Driver, as represented by step 403. A Universal Driver that may be used is disclosed in U.S. patent application Ser. No. 09/564,619 for A Universal Driver Server, A filed May 4, 2000, the disclosure of which is herein incorporated by reference.

On the Universal Driver system, the data can be reformatted, as represented by step 404, into a format compatible to the OS (for example, audio data can be formatted from OS in Apple to OS in Intel). If, at step 402, it is determined that the file is compatible with the system, then the routine proceeds to step 407.

If the data do not need to be reformatted, the routine proceeds to step 414 and the data are processed as the user requests. Otherwise, the file is sent, to the universal server; and this server checks, at step 407, whether the file is executables—i.e., programs that were obtained after compilation. If the file is executable, then, as represented by steps 408 and 409, the routine checks the Universal Driver to determine whether the program can be replaced on the Universal Driver. Copending patent application Ser. No. 09/564,619 describes a suitable Universal Driver that can be used in the practice of this invention.

If the program can be so replaced, then, at step 410, the program is replaced at the Universal Driver; and then, at step 411, the program is are sent to the user. If, however, at step 409, the program can not be replaced at the Universal Driver, then the routine proceeds to step 412, where the UCS checks to determine if the source code exists on the storage of source code 110. If the source code does not exist, the routine exits. If the source code exists, then the program is recompiled, at step 413, in a new OS (using 108), and then the program is sent to the user.

At step 414, the routine checks for instructions to format data. First, it check the user instructions. If they are absent, it checks the computer menu instructions. After that, data are formatted, at step 415, according to the instructions, and then the data are sent to the user.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method for re-formatting computer files, comprising the steps:
   inputting a data file into a computer having a specified operating system, wherein the computer is of a given type, has a driver of a given type, includes a word processing application, and is operated by a user, the specified operating system is a first operating system, and the data file is a given program having a first source code;
   using said computer to determine if the data file is compatible with the specified operating system;
   if the data file is not compatible with the computer, said computer transmitting the data file over the Internet from said computer to a universal server; and
   the universal server, transforming the data file into a format compatible with the specified operating system of the computer, and sending the transformed data file back to the computer;
   providing first and second databases, using the first database to identify a group of user requirements, and using the second database to hold information about the computer;
   the user entering into the first database information identifying
   i) the data file,
   ii) text that needs to be converted into a given word processing application, and
   iii) files that need to be converted into a given audio application;
   providing the second database with computer information identifying (i) the specified operating system, (ii) the type of the computer, (iii) the type of the driver of the computer, and (iv) the word processing application on the computer, including the steps of storing the second database on a universal conversion server database, and reading said computer information from a file on the computer;
   wherein the step of transforming the data file includes the steps of
   i) using a universal driver to receive the data file from the computer,
   ii) the universal driver sending the data file to the universal server,
   iii) linking the universal server to a multitude of source codes, including the step of providing a table including links to source codes, the given program's executable code, and the given program's file name,
   iv) providing a license agreement identifying allowable compilations and fees for said compilations,
   the universal server
   v) defining automatically what changes are needed to the given program and how the given program should be changed,
   vi) defining the type of data in the given program and the operating systems for which the given program was formatted,
   vii) checking to determine what operating system is on the computer and what applications are on the computer to process the type of data in the given program,
   viii) sending the file data to a formatting server and asking the formatting server to reformat the file data to an application available on the computer,
   ix) searching whether there is a source code that was used to compile the given program received from the computer,
   x) using the first source code to compile a second source code for the specified operating system, including the step of adapting the first source code for compilation in the specified operating system; and after said first source code is adapted, compiling said second source code using a compiler from a set of compilers; and
   wherein the step of sending the transformed data file back to the computer includes the step of sending said compiled second source code to the computer.

2. A method according to claim 1, wherein:
   the step of transforming the data file includes the further step of the universal server using the information read from the computer to determine how to change the data file received from the computer;
   the step of linking the universal server to the multitude of source codes includes the step of storing said source codes in a module; and
   the step of searching whether there is a source code that was used to compile the given program includes the step of searching said module for the first source code.

* * * * *